(12) United States Patent
Mukaiyama

(10) Patent No.: US 10,845,807 B2
(45) Date of Patent: Nov. 24, 2020

(54) MANAGING APPARATUS

(71) Applicant: TOYOTA JIDOSHA KABUSHIKI KAISHA, Toyota (JP)

(72) Inventor: Yoshio Mukaiyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/148,119

(22) Filed: Oct. 1, 2018

(65) Prior Publication Data

US 2019/0101918 A1 Apr. 4, 2019

(30) Foreign Application Priority Data

Oct. 2, 2017 (JP) .................................. 2017-192865

(51) Int. Cl.
*G05D 1/00* (2006.01)
*G06Q 10/00* (2012.01)
*B62D 15/02* (2006.01)
*G08G 1/01* (2006.01)

(52) U.S. Cl.
CPC ....... *G05D 1/0088* (2013.01); *B62D 15/0285* (2013.01); *G06Q 10/00* (2013.01); *G08G 1/0137* (2013.01)

(58) Field of Classification Search
CPC .... G05D 1/0088; G06Q 10/00; G08G 1/0137; G08G 1/146; B62D 15/0285
USPC .......................................................... 701/23
See application file for complete search history.

(56) References Cited

U.S. PATENT DOCUMENTS

| | | | | |
|---|---|---|---|---|
| 9,672,734 | B1 * | 6/2017 | Ratnasingam | ....... G08G 1/0145 |
| 9,802,661 | B1 * | 10/2017 | Kentley-Klay | ....... B62D 63/025 |
| 2004/0119818 | A1 * | 6/2004 | Mukaiyama | ........... G08G 1/166 348/116 |
| 2004/0138809 | A1 * | 7/2004 | Mukaiyama | ........... G08G 1/163 701/400 |
| 2004/0158390 | A1 * | 8/2004 | Mukaiyama | ........... G01C 21/26 701/400 |
| 2004/0181339 | A1 * | 9/2004 | Mukaiyama | ........... G08G 1/161 701/301 |
| 2009/0207044 | A1 * | 8/2009 | Tomita | ..................... G08G 1/14 340/932.2 |

(Continued)

FOREIGN PATENT DOCUMENTS

| | | |
|---|---|---|
| DE | 10 2014 224 108 A1 | 6/2016 |
| JP | 2015-074321 A | 4/2015 |

(Continued)

*Primary Examiner* — Atul Trivedi
(74) *Attorney, Agent, or Firm* — Sughrue Mion, PLLC

(57) ABSTRACT

A managing apparatus provides self-driving of a vehicle, which allows the vehicle to enter a parking space out of a plurality of parking spaces from an outside of a parking lot including the plurality of parking spaces, and which allows the vehicle to leave the parking lot for a predetermined place in the outside. The managing apparatus is provided with: a wait time setting device configured to set a maximum wait time of the vehicle in the predetermined place; and a controller configured to set a driving route for returning the vehicle to the parking lot from the predetermined place on condition that the maximum wait time elapses from an arrival of the vehicle in the predetermined place, and configured to provide the self-driving of the vehicle along the driving route.

19 Claims, 6 Drawing Sheets

(56) References Cited

U.S. PATENT DOCUMENTS

| | | | |
|---|---|---|---|
| 2011/0115647 A1* | 5/2011 | Mukaiyama | G08G 1/096716 340/907 |
| 2011/0133959 A1* | 6/2011 | Suzuki | G08G 1/14 340/932.2 |
| 2012/0123640 A1* | 5/2012 | Mukaiyama | G08G 1/096741 701/36 |
| 2015/0029039 A1* | 1/2015 | Mukaiyama | G08G 1/096783 340/905 |
| 2015/0285645 A1 | 10/2015 | Maise et al. | |
| 2015/0346727 A1* | 12/2015 | Ramanujam | B62D 15/0285 701/23 |
| 2015/0353080 A1* | 12/2015 | Mukaiyama | E05B 77/54 701/23 |
| 2016/0018822 A1* | 1/2016 | Nevdahs | G05D 1/08 701/26 |
| 2016/0075375 A1* | 3/2016 | Yamashita | B60K 35/00 701/41 |
| 2016/0362103 A1 | 12/2016 | Buschenfeld et al. | |
| 2017/0045369 A1* | 2/2017 | Kim | G08G 1/096741 |
| 2017/0144654 A1* | 5/2017 | Sham | G05D 1/0088 |
| 2017/0212511 A1* | 7/2017 | Paiva Ferreira | G07C 5/008 |
| 2017/0253237 A1* | 9/2017 | Diessner | B60W 10/04 |
| 2017/0327125 A1 | 11/2017 | Nordbruch | |
| 2017/0329346 A1* | 11/2017 | Latotzki | G05D 1/0088 |
| 2018/0086381 A1* | 3/2018 | Hoffman, Jr. | G05D 1/0225 |
| 2018/0105208 A1* | 4/2018 | Kim | G05D 1/0011 |
| 2018/0148094 A1* | 5/2018 | Mukaiyama | B60T 7/16 |
| 2018/0150080 A1* | 5/2018 | Gross | G05D 1/0088 |
| 2018/0170365 A1* | 6/2018 | Shani | E04H 6/424 |
| 2018/0208245 A1* | 7/2018 | Mizutani | B60W 30/06 |
| 2018/0239352 A1* | 8/2018 | Wang | B60W 50/082 |
| 2018/0345955 A1* | 12/2018 | Kim | B62D 15/028 |
| 2019/0073902 A1* | 3/2019 | Indoh | G08G 1/143 |
| 2019/0079514 A1* | 3/2019 | Zhu | B60W 30/00 |
| 2019/0101925 A1* | 4/2019 | Simmons | G05D 1/0231 |
| 2019/0130736 A1* | 5/2019 | Silver | G05D 1/0088 |
| 2019/0146513 A1* | 5/2019 | Tomita | G05D 1/0278 701/50 |
| 2019/0176888 A1* | 6/2019 | Lee | G05D 1/0225 |
| 2019/0221061 A1* | 7/2019 | Mukaiyama | G07B 15/02 |
| 2019/0333181 A1* | 10/2019 | Simpson | G06Q 30/0283 |
| 2019/0375450 A1* | 12/2019 | Medagoda | B62D 15/025 |
| 2020/0005649 A1* | 1/2020 | Kim | G08G 1/168 |

FOREIGN PATENT DOCUMENTS

| | | |
|---|---|---|
| JP | 2015-176468 A | 10/2015 |
| WO | 2015/062769 A1 | 5/2015 |

* cited by examiner

MANAGING APPARATUS

CROSS-REFERENCE TO RELATED APPLICATIONS

This application is based upon and claims the benefit of priority of the prior Japanese Patent Application No. 2017-192865, filed on Oct. 2, 2017, the entire contents of which are incorporated herein by reference.

BACKGROUND

1. Technical Field

Embodiments of the present disclosure relate to a managing apparatus configured to manage a vehicle in a parking lot or a car park.

2. Description of the Related Art

For this type of apparatus, for example, there is proposed an apparatus that is configured to automatically drive and park a vehicle with an automatic drive function in a parking lot and that is configured to automatically drive a parked vehicle so that the parked vehicle arrives at a pick-up or boarding place before a scheduled departure time point, which is specified by a user (refer to Japanese Patent Application Laid Open No. 2015-176468 (Patent Literature 1)). Alternatively, there is proposed an apparatus that is configured to generate a route starting from a parking space to a pick-up position and that is configured to determine a time for a vehicle to start to move, in order that the vehicle, which is parked in the parking space, arrives at the pick-up position on time (refer to PCT International Publication No. WO2015/062769 (Patent Literature 2)).

In a parking lot in which this type of apparatus is applied, when a vehicle enters, a user gets out of the vehicle at a predetermined drop-off or alighting place, and the vehicle is then automatically moved from the drop-off place to a parking space. When a vehicle leaves, the vehicle is automatically moved from the parking space to a predetermined pick-up place. In a time period in which there are relatively many leaving vehicles, such as in the evening, there are many vehicles that should be allowed to leave. On the other hand, a space for the pick-up place is limited. At this time, if the user does not arrive at the pick-up place before the scheduled departure (or boarding or pick-up) time point, the user's vehicle continues to occupy the pick-up place. As a result, it is likely hard that parked vehicles leave smoothly. This problem cannot be solved by technologies/techniques described in the aforementioned Patent Literatures 1 and 2.

SUMMARY

In view of the aforementioned problems, it is therefore an object of embodiments of the present disclosure to provide a managing apparatus configured to suppress an occupancy time of a vehicle in a pick-up place so that a vehicle can leave smoothly.

The above object of embodiments of the present disclosure can be achieved by a managing apparatus allows self-driving of a vehicle, which allows the vehicle to enter a parking space out of a plurality of parking spaces from an outside of a parking lot including the plurality of parking spaces, and which allows the vehicle to leave the parking lot for a predetermined place in the outside, the managing apparatus provided with: a wait time setting device configured to set a maximum wait time of the vehicle in the predetermined place; and a controller configured to set a driving route for returning the vehicle to the parking lot from the predetermined place on condition that the maximum wait time elapses from an arrival of the vehicle in the predetermined place, and configured to provide the self-driving of the vehicle along the driving route.

DETAILED DESCRIPTION OF THE EMBODIMENTS

A managing apparatus according to an embodiment will be explained with reference to FIG. 1 to FIG. 6. In the following embodiment, an example of the managing apparatus is a "parking-lot managing apparatus".

(Overview)

Figure 1:
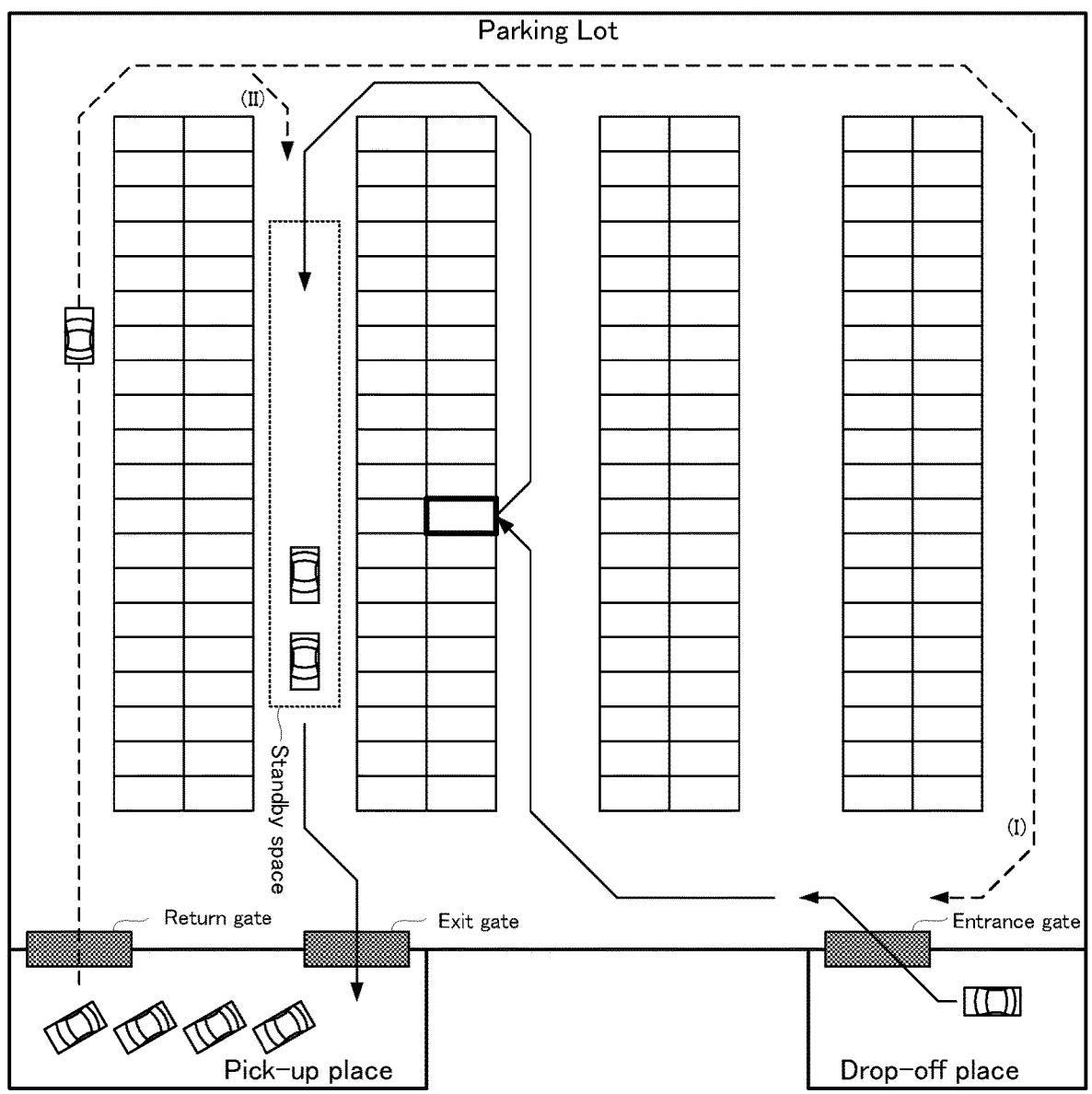
FIG. 1 is a diagram illustrating an overview of a parking lot according to an embodiment.

Firstly, an overview of a parking lot in which the parking-lot managing apparatus according to the embodiment is installed will be explained with reference to FIG. 1. FIG. 1 is a diagram illustrating the overview of the parking lot according to the embodiment.

In FIG. 1, a user gets out of a vehicle at a drop-off or alighting place in an outside of the parking lot. When the vehicle enters, the parking-lot managing apparatus is configured to transmit an instruction to the vehicle to park in a predetermined parking space (e.g., in a parking space indicated by a thick frame in FIG. 1). The vehicle that has received the instruction may enter the parking lot through an entrance gate, and may park in the predetermined parking space, for example, by using an automatic drive function. When a vehicle leaves, the parking-lot managing apparatus is configured to transmit an instruction to the vehicle that is to be left, to move to a pick-up or boarding place. The vehicle that has received the instruction may move to the pick-up place through an exit gate from the parking lot, for example, by using the automatic drive function. If there is no empty space in the pick-up place, the leaving vehicle waits in a standby space near the exit gate.

Particularly in the embodiment, if a wait time in the pick-up place of the vehicle that has moved to the pick-up place exceeds a maximum wait time, the parking-lot managing apparatus is configured to transmit an instruction to the vehicle that has waited for more than the maximum wait time, to return to the parking lot. The vehicle that has received the instruction may enter the parking lot through a return gate, for example, by using the automatic drive function. The maximum wait time will be described later.

(Configuration)

Figure 2:
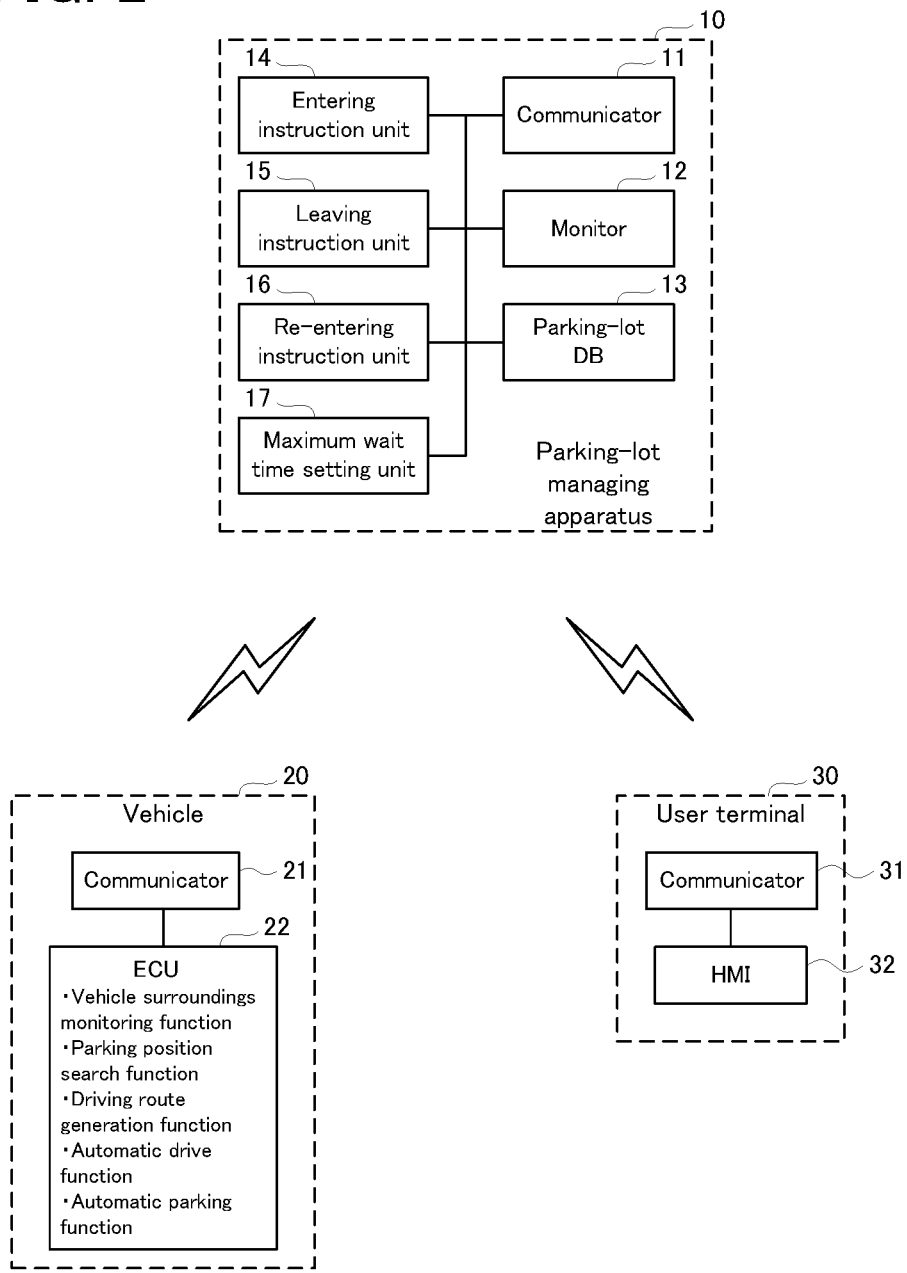
FIG. 2 is a block diagram illustrating a parking-lot-side apparatus according the embodiment.

Next, a configuration of the parking-lot managing apparatus will be explained with reference to FIG. 2. FIG. 2 is a block diagram illustrating a parking-lot-side apparatus according the embodiment.

In FIG. 2, a parking-lot managing apparatus 10 is provided with a communicator 11, a monitor 12, a parking-lot database (DB) 13, an entering instruction unit 14, a leaving instruction unit 15, a re-entering instruction unit 16, and a maximum wait time setting unit 17. The monitor 12 is configured to monitor a vehicle status or the like, in each of the parking lot, the drop-off place, and the pick-up place, for example, by using a camera, an optical sensor, or the like. The parking-lot database 13 is configured to store therein, for example, the number of parking spaces, a position (or coordinates) of each parking space, driving route information, information associated with a situation of utilization in the past, or the like. The entering instruction unit 14, the leaving instruction unit 15, the re-entering instruction unit 16, and the maximum wait time setting unit 17 will be described later.

A vehicle 20 targeted by the parking lot (refer to FIG. 1) in which the parking-lot managing apparatus 10 is installed, is provided with a communicator 21 and an electronic control unit (ECU) 22. The ECU 22 may have, for example, a vehicle surroundings monitoring function, a parking position search function, a driving route generation function, an automatic drive function, an automatic parking function, and the like. Those functions can be realized by the existing technologies/techniques, and an explanation of the details will be thus omitted.

A user terminal 30 held by a user of the vehicle 20 is provided with a communicator 31 and a human machine interface (HMI) 32. The user terminal 30 is configured to display an instruction associated with the parking of the vehicle 20 (e.g., an entering instruction) and information associated with the parking space of the vehicle 20. The user terminal 30 may be an exclusive terminal, or may be a terminal realized by installing an exclusive application, for example, to a smartphone or the like.

(Operation of Parking—Lot Managing Apparatus)

Figure 3:
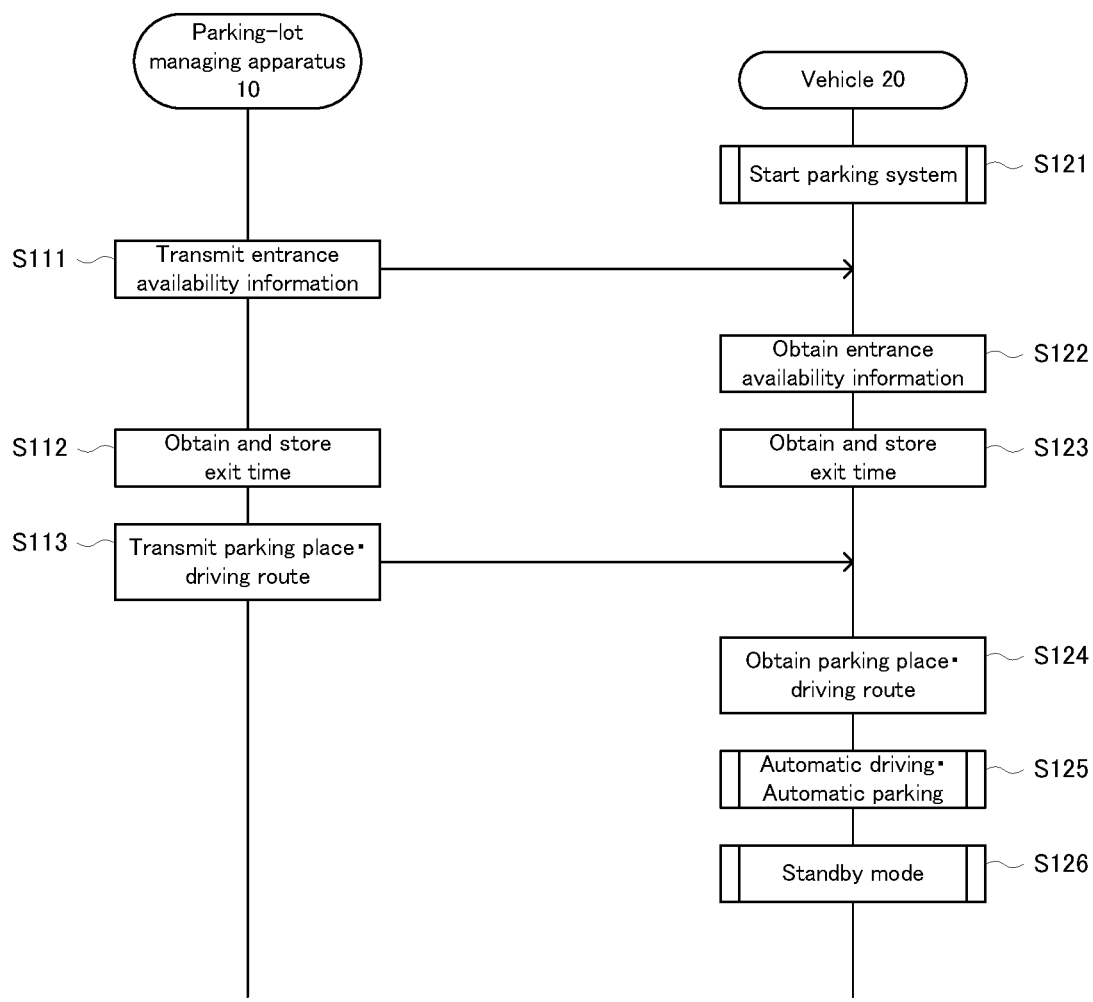
FIG. 3 is a flowchart illustrating an entering process according the embodiment.
Figure 4:
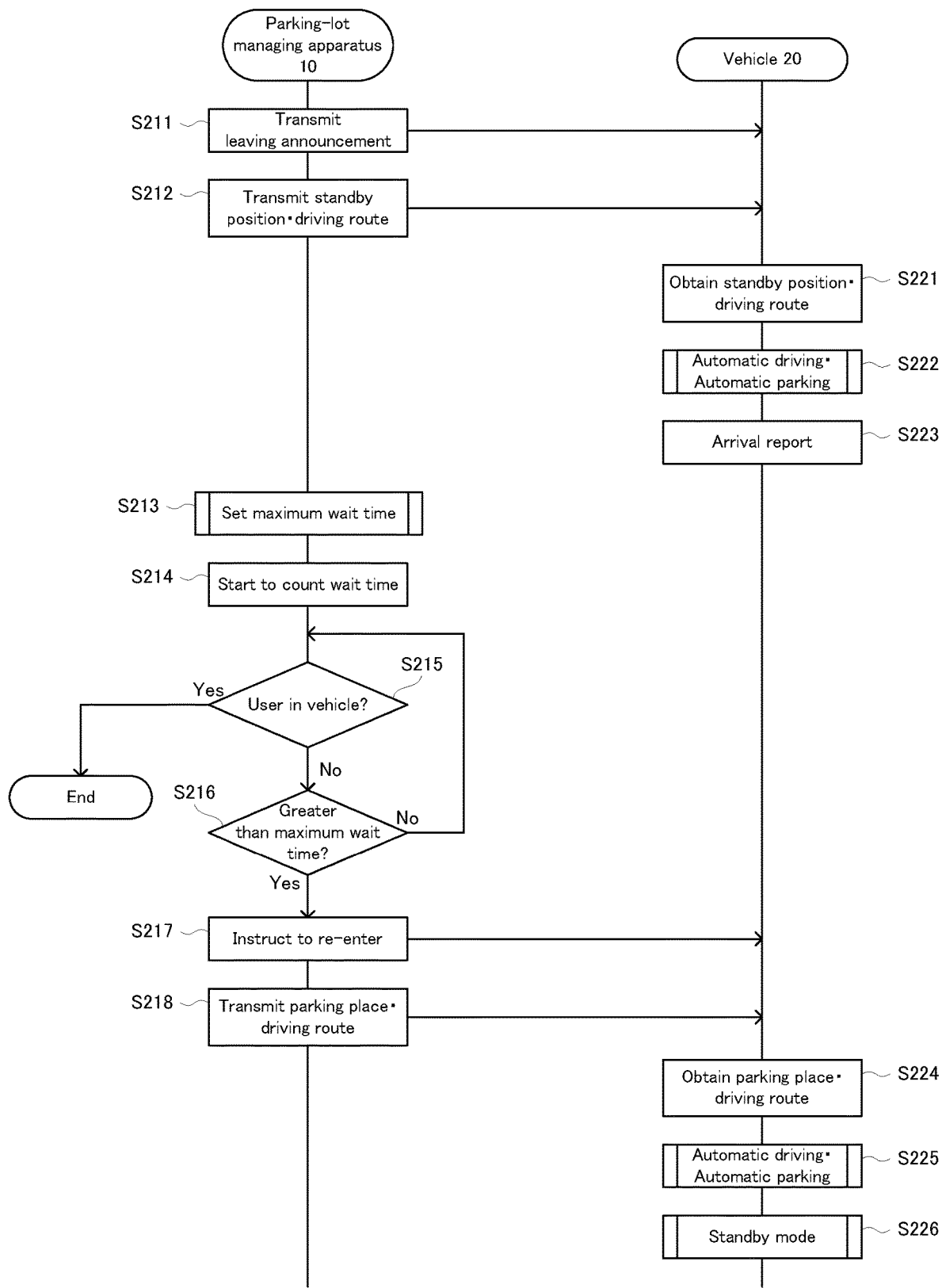
FIG. 4 is a flowchart illustrating a leaving process according the embodiment.
Figure 5:
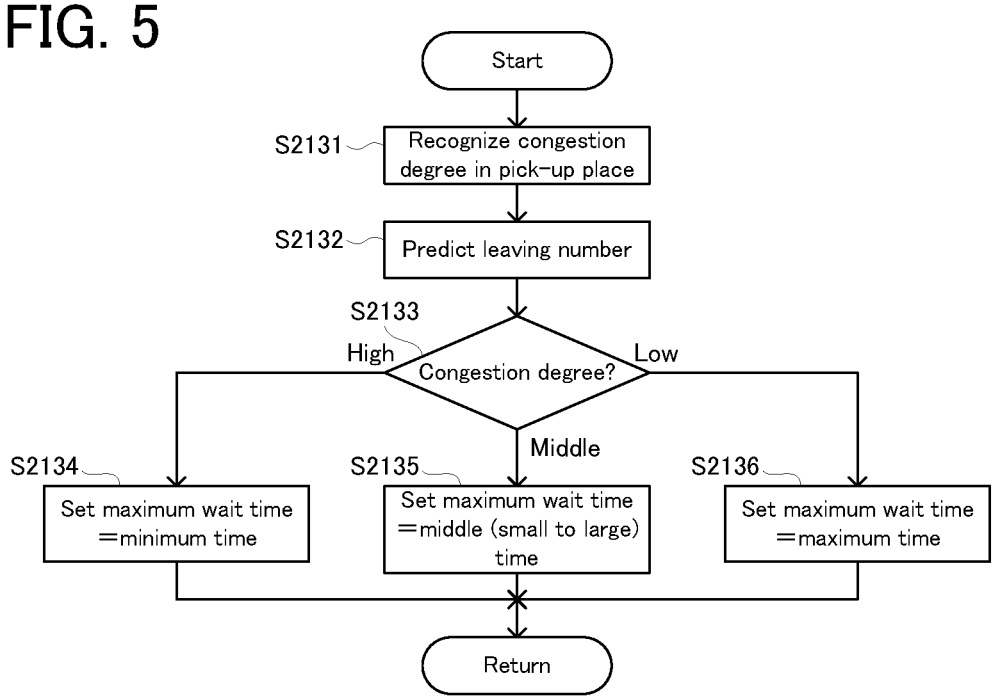
FIG. 5 is a flowchart illustrating a maximum wait time setting process according the embodiment.
Figure 6:
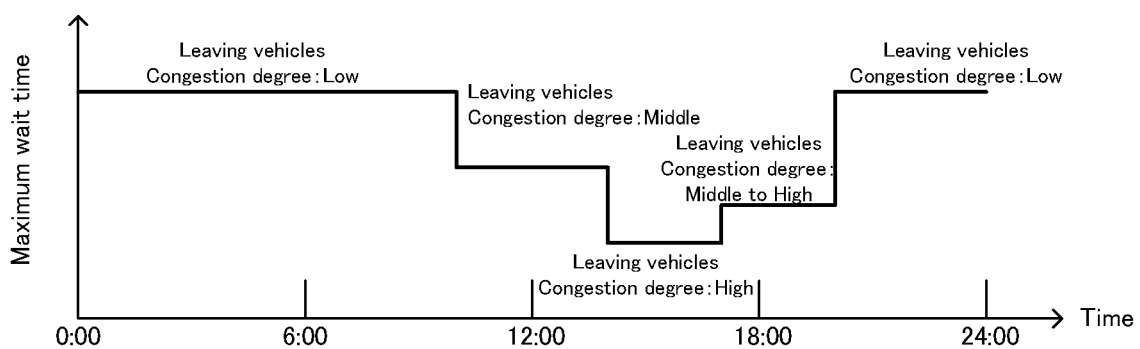
FIG. 6 is a diagram illustrating an example of a maximum wait time according the embodiment.

Next, the operation of the parking-lot managing apparatus 10 will be explained with reference to FIG. 3 to FIG. 6. FIG. 3 is a flowchart illustrating an entering process according the embodiment. FIG. 4 is a flowchart illustrating a leaving process according the embodiment. FIG. 5 is a flowchart illustrating a maximum wait time setting process according the embodiment. FIG. 6 is a diagram illustrating an example of the maximum wait time according the embodiment.

1. Entering Process

In FIG. 3, firstly, if a parking system is started by the user of the vehicle 20 in the drop-off place (refer to FIG. 1), the vehicle 20 and the parking-lot managing apparatus 10 are allowed to communicate with each other (step S121). Here, the parking system may be started by the user operating a not-illustrated predetermined switch or the like, which is mounted on the vehicle 20, or may be started via the user terminal 30. The parking system conceptually includes, for example, the vehicle surroundings monitoring function, the parking position search function, the driving route generation function, the automatic drive function, and the automatic parking function (refer to FIG. 2). If the parking system is started, those functions become effective.

After the communication with the vehicle 20 is allowed, the entering instruction unit 14 of the parking-lot managing apparatus 10 may determine whether or not the vehicle 20 can enter, on the basis of an output of the monitor 12 (e.g., information indicating a vehicle status in the parking lot, etc.). The entering instruction unit 14 then transmits a determination result to the vehicle 20, as entrance availability information (step S111). The ECU 22 of the vehicle 20 obtains the entrance availability information (step S122), and notifies the user of information corresponding to the entrance availability information (e.g., "available", "full", etc.).

In FIG. 1, as a matter of convenience, the drop-off place is next to the parking lot; however, the drop-off place may be located relatively far from the parking lot in some cases. The user can know whether or not the parking lot is available by the entrance availability information that is transmitted to the vehicle 20.

If the entrance availability information indicates that the vehicle 20 cannot enter the parking lot (i.e., full), a subsequent procedure depends on the user's decision; for example, the vehicle 20 may be moved to use another parking lot, or the vehicle 20 may wait until being allowed to enter.

Here, the entering process illustrated in FIG. 3 will be explained in the assumption that the entrance availability information indicates that the vehicle 20 can enter the parking lot. After the step S122, a leaving time point set by the user is obtained (steps S112, S123).

At this time, if the user sets the leaving time point via a not-illustrated input device mounted on the vehicle 20, the ECU 22 of the vehicle 20 may obtain and store the set leaving time point, for example, in a memory or the like. The ECU 22 may further transmit a signal indicating the leaving time point, to the parking-lot managing apparatus 10. The entering instruction unit 14 of the parking-lot managing apparatus 10 that has received the signal may store the leaving time point indicated by the signal, in the parking-lot DB 13, in association with, e.g., specific information indicating the vehicle 20, information indicating a parking place of the vehicle 20, or the like. Alternatively, if the user sets the leaving time point via the HMI 32 of the user terminal 30, a signal indicating the leaving time point may be transmitted to the parking-lot managing apparatus 10 and the vehicle 20 via the communicator 31.

The entering instruction unit 14 of the parking-lot managing apparatus 10 then determines a parking place of the vehicle 20 and a driving route starting from the drop-off place to the parking place, with reference to, for example, the position of each parking space stored in the parking-lot DB 13 and the driving route information, and transmits a signal indicating the determined parking place and the determined driving route, to the vehicle 20 (step S113).

The ECU 22 of the vehicle 20 obtains the signal indicating the parking place and the driving route (step S124). After the user gets out of the vehicle 20, the ECU 22 may generate a driving route on which the vehicle 20 actually should run, by using the driving route generation function, for example, in view of an obstacle or the like in the surroundings of the vehicle 20, which is detected by the vehicle surroundings monitoring function, with reference to the driving route indicated by the obtained signal. The ECU 22 may then control, for example, an engine, a motor, various actuators or the like, so that the vehicle 20 runs along the generated driving route, by using the automatic drive function. After the vehicle 20 passes through the entrance gate and moves to near the parking place indicated by the obtained signal, the ECU 22 detects the parking place (e.g., a white line indicating the parking space, or the like) by using the parking position search function, and parks the vehicle 20 in the parking place by using the automatic parking function (step S125).

The ECU 22 then sets the vehicle 20 in a standby mode (step S126). The "standby mode" herein is, for example, a state in which energy consumption is reduced or suppressed, while communication is allowed between the vehicle 20 and the parking-lot managing apparatus 10.

The step S112 and the step S123, i.e., obtaining and storing the leaving time point, may be omitted. In other words, the user may not set the leaving time point when entering. In this case, the leaving time point may be set via the user terminal 30 after the completion of the parking of the vehicle 20, or a signal indicating a leaving instruction may be transmitted to the parking-lot managing apparatus 10 from the user terminal 30 in such timing that the user desires the vehicle to leave.

2. Leaving Process

In FIG. 4, the leaving instruction unit 15 of the parking-lot managing apparatus 10 transmits a leaving announcement, to the vehicle 20 via the communicator 11, a predetermined time before the set leaving time point, or when receiving the signal indicating the leaving instruction of the vehicle 20 (step S211). The ECU 22 of the vehicle 20 that has received the leaving announcement may release or cancel the standby mode. The "predetermined time before the leaving time point" may be determined, for example, in view of a time required to move to the pick-up place (refer to FIG. 1) from the parking place of the vehicle 20, or the like.

The leaving instruction unit 15 then determines a standby position of the vehicle 20 in the pick-up place and a driving route starting from the parking place to the standby position, with reference to, for example, the driving route information or the like stored in the parking-lot DB 13, and transmits a signal indicating the determined standby position and the determined driving route, to the vehicle 20 (step S212).

The ECU 22 of the vehicle 20 obtains the signal indicating the standby position and the driving route (step S221). The ECU 22 may then generate a driving route on which the vehicle 20 actually should run, by using the driving route generation function, for example, in view of an obstacle or the like in the surroundings of the vehicle 20, which is detected by the vehicle surroundings monitoring function, with reference to the driving route indicated by the obtained signal. The ECU 22 may then control, for example, the engine, the motor, the various actuators or the like, so that the vehicle 20 runs along the generated driving route, by using the automatic drive function. After the vehicle 20 passes through the exit gate and moves to near the standby position indicated by the obtained signal, the ECU 22 detects the standby position by using the parking position search function, and parks the vehicle 20 in the standby position by using the automatic parking function (step S222).

The ECU 22 then transmits an arrival report to the parking-lot managing apparatus 10 via the communicator 21 (step S223). At this time, the ECU 22 may keep the vehicle 20 travelable. The maximum wait time setting unit 17 of the parking-lot managing apparatus 10 that has received the arrival report sets the maximum wait time, which is a maximum value of a time in which the vehicle 20 can wait in the pick-up place (step S213).

Now, a method of setting the maximum wait time will be explained with reference to the flowchart in FIG. 5. In FIG. 5, the maximum wait time setting unit 17 recognizes a congestion degree of the pick-up place on the basis of the output of the monitor 12 (e.g., the information indicating the vehicle status or the like in the parking lot and in the pick-up place) (step S2131). Specifically, the maximum wait time setting unit 17 may recognize a present congestion degree, for example, on the basis of the storage number in the pick-up place, the number of vehicles that are parked in the pick-up place, the number of vehicles that wait to leave (e.g., the number of vehicles that are in the standby space of the parking lot (refer to FIG. 1)), the number of leaving instructions per time.

In parallel with the step S2131, the maximum wait time setting unit 17 may predict a future leaving number, i.e., the number of vehicles that will leave in the future, on the basis of the information associated with the situation of utilization in the past, the leaving time point of each vehicle, a tendency of a delay time with respect to the leaving time point, or the like, which are stored in the parking-lot DB 13, and a present time point.

The maximum wait time setting unit 17 may set the maximum wait time on the basis of results of the step S2131 and the step S2132. Specifically, if the congestion degree is "high" (step S2133: High), the maximum wait time setting unit 17 sets a minimum value of a time range that can be set as the maximum wait time, as the maximum wait time (step S2134). If the congestion degree is "middle" (the step S2133: Middle), the maximum wait time setting unit 17 sets a value near the center of the time range that can be set as the maximum wait time, as the maximum wait time (step S2135). If the congestion degree is "low" (the step S2133: Low), the maximum wait time setting unit 17 sets a maximum value of the time range that can be set as the maximum wait time, as the maximum wait time (step S2136).

With regard to a relation between the maximum wait time set in the above manner and a leaving time zone, for example, as illustrated in FIG. 6, a relatively short maximum wait time may be set for the evening in which the congestion degree is relatively high, and a relatively long maximum wait time may be set for the midnight to the early morning in which the congestion degree is relatively low.

Back in FIG. 4 again, after the step S213, the re-entering instruction unit 16 of the parking-lot managing apparatus 10 starts to count the wait time associated with the vehicle 20 (step S214). The re-entering instruction unit 16 then determines whether or not the user is in the vehicle 20 (step S215). Here, whether or not the user is in the vehicle 20 may be determined, for example, by detecting whether or not a signal indicating the user's ride is transmitted from the vehicle 20, whether or not the parking system is turned off, or similar situations.

In the determination in the step S215, if it is determined that the user is in the vehicle 20 (the step S215: Yes), the leaving process illustrated in FIG. 4 is ended. On the other hand, in the determination in the step S215, if it is determined that the user is not in the vehicle 20 (the step S215: No), the re-entering instruction unit 16 determines whether or not the wait time is greater than the maximum wait time (step S216). If it is determined that the wait time is not greater than the maximum wait time (the step S216: No), the re-entering instruction unit 16 performs the determination in the step S215 again.

On the other hand, in the determination in the step S216, if it is determined that the wait time is greater than the maximum wait time (the step S216: Yes), the re-entering instruction unit 16 transmits a signal indicating a re-entering instruction to the vehicle 20 (step S217). The re-entering instruction unit 16 then transmits a signal indicating a parking place in which the vehicle 20 is parked when re-entering and a driving route starting from the pick-up place to the parking place, to the vehicle 20, on the basis of the output of the monitor 12 and the information stored in the parking-lot DB 13 (step S218). The driving route at this time may be, for example, a route on which the vehicle enters the parking lot through the return gate from the pick-up place, joins a line of entering vehicles, and goes to the parking place (refer to a dashed line (I) in FIG. 1), or a route on which the vehicle enters the parking lot through the return gate from the pick-up place and goes directly to the standby space near the exit gate or a route on which the vehicle joins a line of leaving vehicles (refer to a dashed line (II) in FIG. 1).

The ECU 22 of the vehicle 20 obtains the signal indicating the parking place and the driving route (step S224). The ECU 22 may then generate a driving route on which the vehicle 20 actually should run, by using the driving route generation function, for example, in view of an obstacle or the like in the surroundings of the vehicle 20, which is detected by the vehicle surroundings monitoring function, with reference to the driving route indicated by the obtained signal. The ECU 22 may then control, for example, the engine, the motor, the various actuators or the like, so that the vehicle 20 runs along the generated driving route, by using the automatic drive function. After the vehicle 20 passes through the return gate and moves to near the parking place indicated by the obtained signal, the ECU 22 detects the parking place by using the parking position search function, and parks the vehicle 20 in the parking place by using the automatic parking function (step S225). The ECU 22 then sets the vehicle 20 in the standby mode (step S226).

After re-entering, if the vehicle 20 is parked in the parking space, i.e., if the parking place is the parking space, the leaving process illustrated in FIG. 4 may be performed again when the leaving instruction unit 15 receives the signal indicating the leaving instruction of the vehicle 20. Alternatively, after re-entering, if the vehicle 20 goes directly to the standby space near the exit gate (refer to FIG. 1) or if the vehicle 20 joins a line of leaving vehicles, the vehicle 20 is allowed to leave in accordance with a flow of the exit of the leaving vehicles.

(Technical Effect)

The parking-lot managing apparatus 10 is configured to return the vehicle 20 from the pick-up place to the parking lot if the wait time of the vehicle 20 that has moved to the pick-up place in the leaving process exceeds the maximum wait time. It is thus possible to prohibit that the pick-up place is occupied by a vehicle for a long time. In addition, an empty space for a vehicle is formed in the pick-up place. It is thus possible to move a following vehicle from the parking lot to the pick-up place. Therefore, according to the parking-lot managing apparatus 10, it is possible to suppress the occupancy time of the vehicle in the pick-up place so that parked vehicles can leave smoothly.

The driving route in re-entering may be set, for example, to a driving route on which the vehicle joins a line of entering vehicles, as illustrated by the dashed line (I) in FIG. 1. Such a configuration may provide a relatively simple driving route of the vehicle in the parking lot. It is thus possible to reduce a processing load of the parking-lot managing apparatus 10.

The driving route in re-entering may be set, for example, to a route on which the vehicle goes directly to the standby space near the exit gate or a route on which the vehicle joins a line of leaving vehicles, as illustrated by the dashed line (II) in FIG. 1. Such a configuration may allow a time required for the vehicle that re-enters to leave again, to be relatively short. As a result, it is possible to improve convenience of the user.

The maximum wait time may be set, for example, in accordance with the congestion degree, which is based on the number of vehicles that are parked in the pick-up place, the information associated with the situation of utilization in the past, the leaving time point of each vehicle, the tendency of the delay time with respect to the leaving time point, or the like. It is therefore possible to set an appropriate maximum wait time in accordance with a congestion situation of leaving vehicles.

MODIFIED EXAMPLE

It is premised in the aforementioned embodiment that the vehicle 20 is configured to drive automatically. The aforementioned parking-lot managing apparatus 10 can be applied, for example, to a parking lot that is provided with a transport mechanism capable of transporting a vehicle on a pallet (or a cargo carriage) altogether, or capable of transporting a vehicle by a conveyor. Such a parking lot can also target a vehicle that does not have the automatic drive function.

Figure 7:
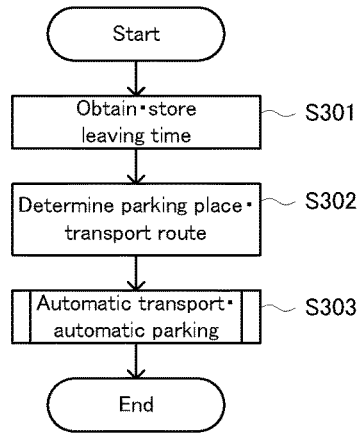
FIG. 7 is a flowchart illustrating an entering process according a modified example.
Figure 8:
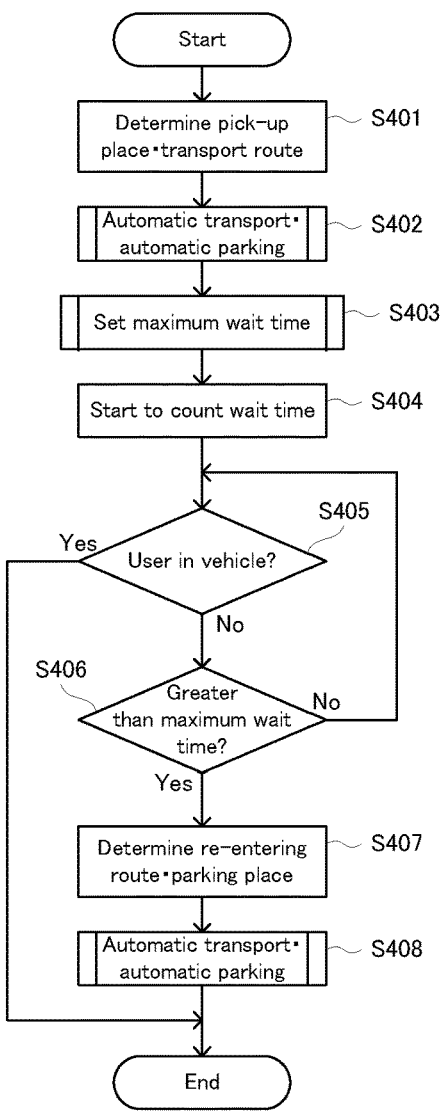
FIG. 8 is a flowchart illustrating a leaving process according the modified example.

The operation of the parking-lot managing apparatus 10 in the parking lot described above will be specifically explained with reference to FIG. 7 and FIG. 8. FIG. 7 is a flowchart illustrating an entering process according to a modified example. FIG. 8 is a flowchart illustrating a leaving process according the modified example.

1. Entering Process

In FIG. 7, firstly, the entering instruction unit 14 of the parking-lot managing apparatus 10 obtains the leaving time point set by the user and stores it in the parking-lot DB 13 (step S301). The entering instruction unit 14 then determines a parking place and a transport route to the parking place, with reference to, for example, the position of the parking space stored in the parking-lot DB 13 and transport route information (step S302).

After the vehicle is parked in a predetermined drop-off place (e.g., on the pallet, on the conveyor) and the user gets out of the vehicle, the entering instruction unit 14 controls the transport mechanism to transport the vehicle in accordance with the determined transport route (step S303). As a result, the vehicle is transported to the determined parking place.

2. Leaving Process

In FIG. 8, the leaving instruction unit 15 of the parking-lot managing apparatus 10 determines a standby position of the vehicle in the pick-up place and a transport route starting from the parking place to the standby position, with reference to, for example, the transport route information stored in the parking-lot DB 13 or the like, a predetermined time before the set leaving time point, or when receiving the signal indicating the leaving instruction of the vehicle 20 (step S401).

The leaving instruction unit 15 then controls the transport mechanism to transport the vehicle in accordance with the determined transport route (step S402). As a result, the vehicle is transported to the determined standby position. The maximum wait time setting unit 17 of the parking-lot managing apparatus 10 then sets the maximum wait time (step S403).

The re-entering instruction unit 16 of the parking-lot managing apparatus 10 then starts to count the wait time (step S404). The re-entering instruction unit 16 then determines whether or not the user is in the vehicle 20 (step S405). In the determination, if it is determined that the user is in the vehicle 20 (the step S405: Yes), the leaving process illustrated in FIG. 8 is ended.

On the other hand, in the determination in the step S405, if it is determined that the user is not in the vehicle 20 (the step S405: No), the re-entering instruction unit 16 determines whether or not the wait time is greater than the maximum wait time (step S406). In the determination, if it is determined that the wait time is not greater than the maximum wait time (the step S406: No), the re-entering instruction unit 16 performs the determination in the step S405 again.

On the other hand, in the determination in the step S406, if it is determined that the wait time is greater than the maximum wait time (the step S406: Yes), the re-entering instruction unit 16 determines a parking place in which the vehicle 20 is parked when re-entering and a transport route starting from the pick-up place to the parking place (step S407). The re-entering instruction unit 16 then controls the transport mechanism to transport the vehicle in accordance with the determined transport route (step S408).

Various aspects of embodiments of the present disclosure derived from the embodiment and the modified example explained above will be explained hereinafter.

A managing apparatus according to an aspect of embodiments of the present disclosure is configured to provide self-driving of a vehicle, which allows the vehicle to enter a parking space out of a plurality of parking spaces from an outside of a parking lot including the plurality of parking spaces, and which allows the vehicle to leave the parking lot for a predetermined place in the outside, and the managing apparatus is provided with: a wait time setting device configured to set a maximum wait time of the vehicle in the predetermined place; and a controller configured to set a driving route for returning the vehicle to the parking lot from the predetermined place on condition that the maximum wait time elapses from an arrival of the vehicle in the predetermined place, and configured to provide the self-driving of the vehicle along the driving route.

The "self-driving" conceptually includes, for example, not only that the vehicle automatically drives by using the automatic driving function or the like, but also that the vehicle is automatically transported (or moved) by the transport mechanism, such as a conveyor. In the aforementioned embodiment, the "maximum wait time setting unit 17" corresponds to an example of the wait time setting device, the "re-entering instruction unit 16" corresponds to an example of the controller, and the "pick-up lace" corresponds to an example of the predetermined place.

The managing apparatus is configured to return the vehicle from the predetermined place to the parking lot if the maximum wait time elapses from the arrival of the vehicle in the predetermined place in the outside of the parking lot, i.e., if the wait time of the vehicle is greater than the maximum wait time. Therefore, according to the managing apparatus, it is possible to suppress the occupancy time of the vehicle that has left, in the pick-up place. In addition, it is possible to move a following vehicle from the parking lot to the place that was occupied by the vehicle that has returned to the parking lot. Therefore, according to the managing apparatus, it is possible that parked vehicles can leave smoothly.

In one aspect of the managing apparatus described above, the wait time setting device is configured to set the maximum wait time so that the maximum wait time becomes shorter as a congestion degree of leaving vehicles becomes higher. According to this aspect, it is possible to set an appropriate maximum wait time in accordance with the congestion degree of leaving vehicles.

According to this aspect, the wait time setting device may be configured to obtain the congestion degree on the basis of at least one of a leaving reservation time and a leaving instruction. By virtue of such a configuration, it is possible to obtain the congestion degree, relatively easily. In the aforementioned embodiment, the "set leaving time point" corresponds to an example of the leaving reservation time. The leaving reservation time and the leaving instruction respectively mean the leaving reservation time and the leaving instruction associated with each of a plurality of vehicles that are parked in the parking lot. The expression "on the basis of the leaving instruction" means, for example, on the basis of the number of the leaving instructions per unit time or per a predetermined time.

In another aspect of the managing apparatus described above, the controller is configured to set a driving route on which the vehicle joins a line of entering vehicles, as the driving route. According to this aspect, the driving route of the vehicle in the parking lot is set to be relatively simple. It is thus possible to reduce a processing load of the managing apparatus.

Alternatively, in another aspect of the managing apparatus described above, the controller is configured to set a driving route on which the vehicle joins a line of leaving vehicles, or a driving route on which the vehicle enters a parking space located around the predetermined place out of the plurality of parking spaces, as the driving route. According to this aspect, it is possible to set a time required for the vehicle that re-enters to leave again, to be relatively short, so that it is possible to improve the convenience of the user.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A managing apparatus configured to cause a vehicle to enter a parking space among a plurality of parking spaces from an outside of a parking area including the plurality of parking spaces, and to cause the vehicle leave from the parking area to a predetermined place in the outside of the area, said managing apparatus comprising:
   a wait time setting device configured to set a maximum wait time of the vehicle in the predetermined place in the outside of the parking area; and
   a controller configured to set a driving route for returning the vehicle to the parking area from the predetermined place in the outside of the parking area on condition that a wait time of the vehicle in the predetermined place in the outside of the parking area exceeds the maximum wait time, and configured to cause the vehicle to travel along the driving route.

2. The managing apparatus according to claim 1, wherein said wait time setting device is configured to set the maximum wait time so that the maximum wait time becomes shorter as a congestion degree of leaving vehicles becomes higher.

3. The managing apparatus according to claim 2, wherein said wait time setting device is configured to obtain the congestion degree on the basis of at least one of a leaving reservation time and a leaving instruction.

4. The managing apparatus according to claim 3, wherein said controller is configured to set a driving route on which the vehicle joins a line of entering vehicles, as the driving route.

5. The managing apparatus according to claim 3, wherein said controller is configured to set a driving route on which the vehicle joins a line of leaving vehicles, or a driving route on which the vehicle enters a parking space located around the predetermined place out of the plurality of parking spaces, as the driving route.

6. The managing apparatus according to claim 2, wherein said controller is configured to set a driving route on which the vehicle joins a line of entering vehicles, as the driving route.

7. The managing apparatus according to claim 2, wherein said controller is configured to set a driving route on which the vehicle joins a line of leaving vehicles, or a driving route on which the vehicle enters a parking space located around the predetermined place out of the plurality of parking spaces, as the driving route.

8. The managing apparatus according to claim 1, wherein said controller is configured to set a driving route on which the vehicle joins a line of entering vehicles, as the driving route.

9. The managing apparatus according to claim 1, wherein said controller is configured to set a driving route on which the vehicle joins a line of leaving vehicles, or a driving route on which the vehicle enters a parking space located around the predetermined place out of the plurality of parking spaces, as the driving route.

10. A managing method for causing a vehicle to enter a parking space among a plurality of parking spaces from an outside of a parking area including the plurality of parking spaces, and to cause the vehicle to leave from the parking area to a predetermined place in the outside of the parking area, said managing method comprising:
   a wait time setting process for setting a maximum wait time of the vehicle in the predetermined place in the outside of the parking area; and
   a controlling process for setting a driving route for returning the vehicle to the parking area from the predetermined place in the outside of the parking area on condition that a wait time of the vehicle in the predetermined place in the outside of the parking area exceeds the maximum wait time, and configured to cause the vehicle to travel along the driving route.

11. The managing method according to claim 10, wherein said wait time setting process sets the maximum wait time so that the maximum wait time becomes shorter as a congestion degree of leaving vehicles becomes higher.

12. The managing method according to claim 11, wherein said wait time setting process obtains the congestion degree on the basis of at least one of a leaving reservation time and a leaving instruction.

13. The managing method according to claim 12, wherein said controlling process sets a driving route on which the vehicle joins a line of entering vehicles, as the driving route.

14. The managing method according to claim 12, wherein said controlling process sets a driving route on which the vehicle joins a line of leaving vehicles, or a driving route on which the vehicle enters a parking space located around the predetermined place out of the plurality of parking spaces, as the driving route.

15. The managing method according to claim 11, wherein said controlling process sets a driving route on which the vehicle joins a line of entering vehicles, as the driving route.

16. The managing apparatus according to claim 11, wherein said controlling process sets a driving route on which the vehicle joins a line of leaving vehicles, or a driving route on which the vehicle enters a parking space located around the predetermined place out of the plurality of parking spaces, as the driving route.

17. The managing method according to claim 10, wherein said controlling process sets a driving route on which the vehicle joins a line of entering vehicles, as the driving route.

18. The managing method according to claim 10, wherein said controlling process sets a driving route on which the vehicle joins a line of leaving vehicles, or a driving route on which the vehicle enters a parking space located around the predetermined place out of the plurality of parking spaces, as the driving route.

19. A managing apparatus configured to cause a vehicle to enter a parking space among a plurality of parking spaces from an outside of a parking area including the plurality of parking spaces, and to cause the vehicle to leave from the parking area to a predetermined place in the outside of the parking area, said managing apparatus comprising:
   a processor programmed to:
      set a maximum wait time of the vehicle in the predetermined place in the outside of the parking area;
      set a driving route for returning the vehicle to the parking area from the predetermined place in the outside of the parking area on condition that a wait time of the vehicle in the predetermined place in the outside of the parking area exceeds the maximum wait time; and
      cause the vehicle to travel along the driving route.

* * * * *